Feb. 19, 1963   W. H. WEST   3,078,116
CONDUIT MEANS FOR A VEHICLE BODY SILL
Filed Sept. 12, 1960
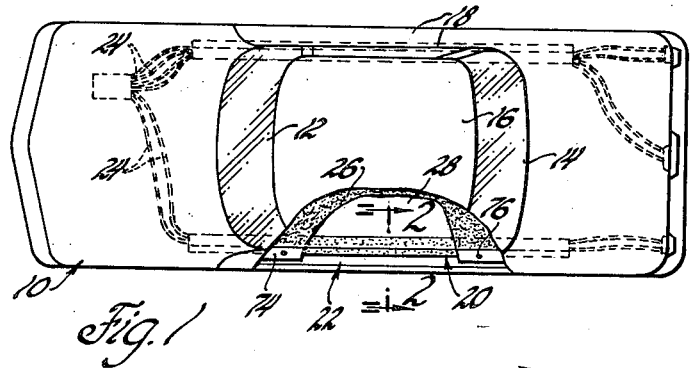
INVENTOR.
Wilson H. West
BY
Herbert Furman
ATTORNEY

3,078,116
CONDUIT MEANS FOR A VEHICLE BODY SILL

Wilson H. West, Madison Heights, Mich., assignor to General Motors Corporation, Detroit, Mich., a corporation of Delaware
Filed Sept. 12, 1960, Ser. No. 55,467
4 Claims. (Cl. 296—1)

This invention relates to vehicle bodies and more particularly to a combined conduit means and trim anchor means for vehicle bodies. In the preferred embodiment of the invention, the combined conduit means and trim anchor means is formed of resilient plastic material, such as polyethylene, polyvinyl chloride, and copolymers of vinyl chloride and vinyl acetate, and includes a conduit portion which is adapted to fit within a structural member of the body, such as the rocker panel or sill structure. The conduit portion includes an integral closure flap which may be opened and closed at will to insert and withdraw electrical wires, hydraulic conduits, etc., into and out of the conduit portion. A mounting flange extends from the conduit portion over the adjacent portion of the body structural member, with this flange and the closure flap being provided with trim anchor ribs along their upper surface. The body trim, such as the floor covering, extends over the closure flap and the mounting flange and is held against the trim anchor ribs by a retainer member, which also clamps the mounting flange against the body structural member to thereby releasably secure the combined conduit means and trim anchor means in place.

By providing conduit means according to this invention, the electrical wires and hydraulic conduits can be easily and quickly mounted on the body in a very convenient manner without having to feed them through various hollow body structural members. Further, the body trim can also be quickly and conveniently mounted on the body and anchored in place.

The primary object of this invention is to provide a new and improved combined conduit means and body trim anchor means for vehicle bodies.

This and other objects of the invention will be readily apparent from the following specification and drawings wherein:

FIGURE 1 is a top plan view of an automobile embodying a combined conduit means and body trim anchor means according to this invention, with parts thereof broken away for clarity of illustration;

FIGURE 2 is an enlarged sectional view taken generally along the plane indicated by line 2—2 of FIGURE 1; and FIGURE 3 is a perspective view.

Referring now particularly to FIGURE 1 of the drawings, a vehicle body 10 includes a windshield 12, a backlite 14, a roof panel structure 16, and doors 18, one at each side of the body. A combined conduit means and trim anchor means 20 extends longitudinally of the body 10 adjacent each side thereof, with the conduit means being fitted within the rocker panel structures or side sill structures 22 of the body and providing an enclosed passage from the forward end of the body to the rearward end thereof for a plurality of electrical wires generally indicated at 24, so that the wires may be quickly and easily installed on the body without having to feed the wires through the various hollow body structural members. The conduit means 20 further provides an anchor means for the outer or side edge portions of the floor covering 26 of the body which covers and conceals the floor panel 28.

Referring now particularly to FIGURE 2 of the drawings, the rocker panel structures 22 of the body comprise an inner member 32 provided with an offset flange portion 34 located generally horizontal and terminating in an upwardly extending lateral flange 36. The outer member 38 includes a lower laterally extending flange 40 which is welded to the member 32 and an upper channel-shaped portion 44, one wall of which provides a flange 46 which is abutted against and secured to the flange 36 to provide a body pinchweld. A flange 48 along the side edge portion of the floor panel 28 is welded to the flange portion 34 to interconnect the rocker panel structures and the floor panel of the body.

The combined conduit means and trim anchor means 20, as shown in FIGURES 2 and 3, includes an offset base portion 52 which seats against the flange 48 of the floor panel 28 and a portion of the flange portion 34 of the inner rocker panel member 32. A laterally extending wall portion 54 is formed integral with the base portion 52 and seats against the flange 36 whereby the base portion 52 and wall portion 54 of the conduit means 20 fits within the rocker panel structure 22 of the body. A closure flap 56 is formed integral with the base portion 52 and extends upwardly and over the base portion, terminating in a short flange 58 which merges into a terminal bead 60. Bead 60 is adapted to be releasably received within a groove 62 formed in the wall portion 54 so as to close the conduit means after the electrical wires 24 have been first fitted therein. A mounting flange 64 extends laterally of the wall portion 54, and over the channel portion 44 of the outer rocker panel member 38, with flange 64 seating on flanges 36 and 40 and the upper wall portion 65 of member 38. The flap 56 and the flange 64 are each provided with a series of outwardly angled spaced ribs 66 which extend from the upper surface thereof, with each rib 66 terminating in a sharp, elongated edge 68.

The floor covering 26 extends over the floor panel 28, the flap 56 and the flange 64, with the ribs 66 grippingly engaging the undersurface of the covering 26 so as to retain the edge portions of the carpeting in place against movement inward of the body toward the center line thereof.

A retainer member 74 overlies the edge portion of covering 26 and clamps the floor covering 26 against the ribs 66 of flange 64 and also clamps the flange 64 against the flange 36 and 46 and against the wall portion 65 of outer rocker panel member 38 so as to fixedly secure the conduit means 20 in place. The retainer member 74 is retained in place on the body by a plurality of longitudinally spaced screws 76.

If it is necessary to obtain access to the wiring 24, all that need be done is to remove the retainer member 74, roll back the edge portion of the floor covering 26 and thereafter open the flap 56 so that complete access may be obtained.

Thus, this invention provides a new and improved combined conduit means and trim anchor means for vehicle bodies.

What is claimed is:

1. The combination comprising a vehicle body having a support member provided with angularly located wall portions, a combined conduit and trim anchor means including an elongated base portion provided with an integral side wall extending laterally thereto along one elongate edge portion thereof and seating against said angularly located wall portions of said body support member, a closure flap integral with said base portion and extending over said base portion from the other elongate edge portion thereof to said side wall, cooperating locking means on said flap and said side wall to secure said flap to said wall and thereby close said conduit means, a mounting flange on said conduit means overlying said support member adjacent one of said wall portions, means for releasably securing said flange to said support member, and means on said flap adapted to grippingly engage vehicle body trim to anchor said trim relative to said conduit means and support member.

2. The combination comprising a vehicle body having a support member provided with angularly located wall portions, a combined conduit and trim anchor means including an elongated base portion provided with an integral side wall extending laterally thereto along one elongate edge portion thereof and seating against said angularly located wall portion of said body support member, a closure flap integral with said base portion and extending over said base portion from the other elongate edge portion thereof to said side wall, cooperating locking means on said flap and said side wall to secure said flap to said wall and thereby close said conduit means, a mounting flange on said side wall overlying said support member adjacent one of said wall portions, anchor means on said flap and flange adapted to grippingly engage vehicle body trim to anchor said trim relative to said conduit means and support member, and means for releasably holding said trim against said flap and flange and for holding said flange against said support member.

3. A combined conduit and trim anchor means for vehicle bodies comprising, in combination, an elongated base portion provided with an integral side wall extending laterally thereto along one elongate edge portion thereof, a closure flap integral with said base portion and extending over said base portion from the other elongate edge portion thereof to said wall, cooperating locking means on said flap and said wall to secure said flap to said wall and thereby close said conduit means, a mounting flange extending laterally of said side wall and being integral therewith, and a plurality of angled ribs integral with said flange and said flap adapted to grippingly engage vehicle body trim to anchor said trim relative to said conduit means.

4. The combination comprising, a vehicle body having a support provided with angularly located wall portions, a combined conduit and trim anchor means of form sustaining resilient plastic material including an elongated base portion provided with an integral side wall member extending laterally thereto along one elongate edge portion thereof and seating against said angularly located wall portions of said body support, a closure member integrally hinged to said base portion and extending over said base portion from the other elongate edge portion thereof to said side wall, cooperating locking means on said closure member and said side wall member to releasably secure said members together and close said conduit means, said locking means including an integral rib on one of said members received within a complementary groove on the other of said members, and means on said closure member adapted to grippingly engage vehicle body trim pressed thereagainst to anchor said trim relative to said conduit means and the body support.

References Cited in the file of this patent

UNITED STATES PATENTS

| | | |
|---|---|---|
| 1,141,188 | Johnson | June 1, 1915 |
| 1,477,752 | Galamb | Dec. 18, 1923 |
| 1,670,465 | Marshall | May 22, 1928 |
| 2,208,723 | Doty | July 23, 1940 |
| 2,218,814 | Duffy | Oct. 22, 1940 |
| 2,991,116 | Andrews | July 4, 1961 |